United States Patent
Keegan et al.

(10) Patent No.: US 9,874,146 B2
(45) Date of Patent: Jan. 23, 2018

(54) GAS TURBINE ENGINE SUPPORT STRUT ASSEMBLY

(75) Inventors: Colm Keegan, Nettleham (GB); Kevin Scott, Branston (GB); Neil Simmons, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 944 days.

(21) Appl. No.: 14/352,276

(22) PCT Filed: Sep. 13, 2012

(86) PCT No.: PCT/EP2012/067880
§ 371 (c)(1),
(2), (4) Date: Jun. 27, 2014

(87) PCT Pub. No.: WO2013/060523
PCT Pub. Date: May 2, 2013

(65) Prior Publication Data
US 2014/0305129 A1    Oct. 16, 2014

(30) Foreign Application Priority Data
Oct. 25, 2011    (EP) .................................... 11186495

(51) Int. Cl.
*F02C 7/20*    (2006.01)
*F01D 25/28*    (2006.01)
(Continued)

(52) U.S. Cl.
CPC ............. *F02C 7/20* (2013.01); *F01D 25/285* (2013.01); *F16C 3/02* (2013.01); *F16C 11/02* (2013.01);
(Continued)

(58) Field of Classification Search
CPC .......... F02C 7/20; F01D 25/285; F16C 11/02; F16C 11/06; F16C 11/0614
See application file for complete search history.

(56) References Cited

U.S. PATENT DOCUMENTS 2,957,713 A * 10/1960 Herbenar ................ F16C 11/06
                                                                277/507
3,831,888 A    8/1974 Baker et al.
(Continued)

FOREIGN PATENT DOCUMENTS

DE    1013466    8/1957
EP    1568903    8/2005
(Continued)

OTHER PUBLICATIONS

RU Official Decision of Grant dated Aug. 18, 2016, for RU application No. 2014120751.

*Primary Examiner* — Arun Goyal
(74) *Attorney, Agent, or Firm* — Beusse Wolter Sanks & Maire (57) ABSTRACT

Support strut assembly for supporting a casing of a functional unit of gas turbine is provided having a strut body for supporting the casing to ground, a ball pivot element mounted to the strut body and a rocker lever mounted to the ball pivot element. The rocker lever inserts into a bearing bore of a support body as part of the casing or ground, the rocker lever inserts into the bearing bore via clearance fit so a pivotal point is generated at a first contact area between the rocker lever and an inner surface of the bearing bore, the rocker lever pivots within the bearing bore around the pivotal point. An elastomeric springing damping element is mounted to the rocker lever between the rocker lever and the a support body providing centering force and damping pivoting of the rocker lever with respect to the support body around the pivotal point.

15 Claims, 6 Drawing Sheets

(51) Int. Cl.
*F16C 3/02* (2006.01)
*F16C 11/02* (2006.01)
*F16C 11/06* (2006.01)

(52) U.S. Cl.
CPC ...... *F16C 11/0614* (2013.01); *F05D 2230/80* (2013.01); *F05D 2260/94* (2013.01); *F05D 2260/941* (2013.01)

(56) References Cited

U.S. PATENT DOCUMENTS

| | | | | |
|---|---|---|---|---|
| 4,662,772 | A * | 5/1987 | Schultz | B60K 20/02 403/114 |
| 6,913,410 | B2 * | 7/2005 | Blanke | F16C 11/0614 403/141 |
| 7,357,591 | B2 * | 4/2008 | Broker | F16C 11/0614 403/122 |
| 2002/0197147 | A1 | 12/2002 | Kawai et al. | |
| 2003/0025033 | A1 | 2/2003 | Levert et al. | |
| 2003/0033816 | A1 | 2/2003 | Huster et al. | |
| 2003/0068192 | A1 | 4/2003 | Schilling | |
| 2003/0025022 | A1 | 6/2003 | Wilcox et al. | |
| 2005/0196227 | A1 | 9/2005 | Mahy et al. | |
| 2009/0064685 | A1 | 3/2009 | Busekros et al. | |
| 2011/0000222 | A1 | 1/2011 | Black et al. | |
| 2011/0016881 | A1 | 1/2011 | Ruiz et al. | |
| 2011/0210631 | A1 | 9/2011 | Siegl et al. | |

FOREIGN PATENT DOCUMENTS

| | | |
|---|---|---|
| GB | 1576262 | 10/1980 |
| RU | 2389921 C2 | 5/2010 |
| WO | WO8501987 | 5/1985 |
| WO | 2010006859 A1 | 1/2010 |

* cited by examiner

GAS TURBINE ENGINE SUPPORT STRUT ASSEMBLY

CROSS REFERENCE TO RELATED APPLICATIONS

This application is the US National Stage of International Application No. PCT/EP2012/067880 filed Sep. 13, 2012, and claims the benefit thereof. The International Application claims the benefit of European Application No. EP11186495 filed Oct. 25, 2011. All of the applications are incorporated by reference herein in their entirety.

FIELD OF INVENTION

The present invention relates to a support strut assembly for supporting a casing of a functional unit of a gas turbine, to a gas turbine and to a method for supporting a casing of a functional unit of a gas turbine.

ART BACKGROUND

In a conventional two shaft gas turbine, a gas generator unit and a power turbine unit are mounted together at its axial ends along an axial direction of the gas turbine.

Figure 8:
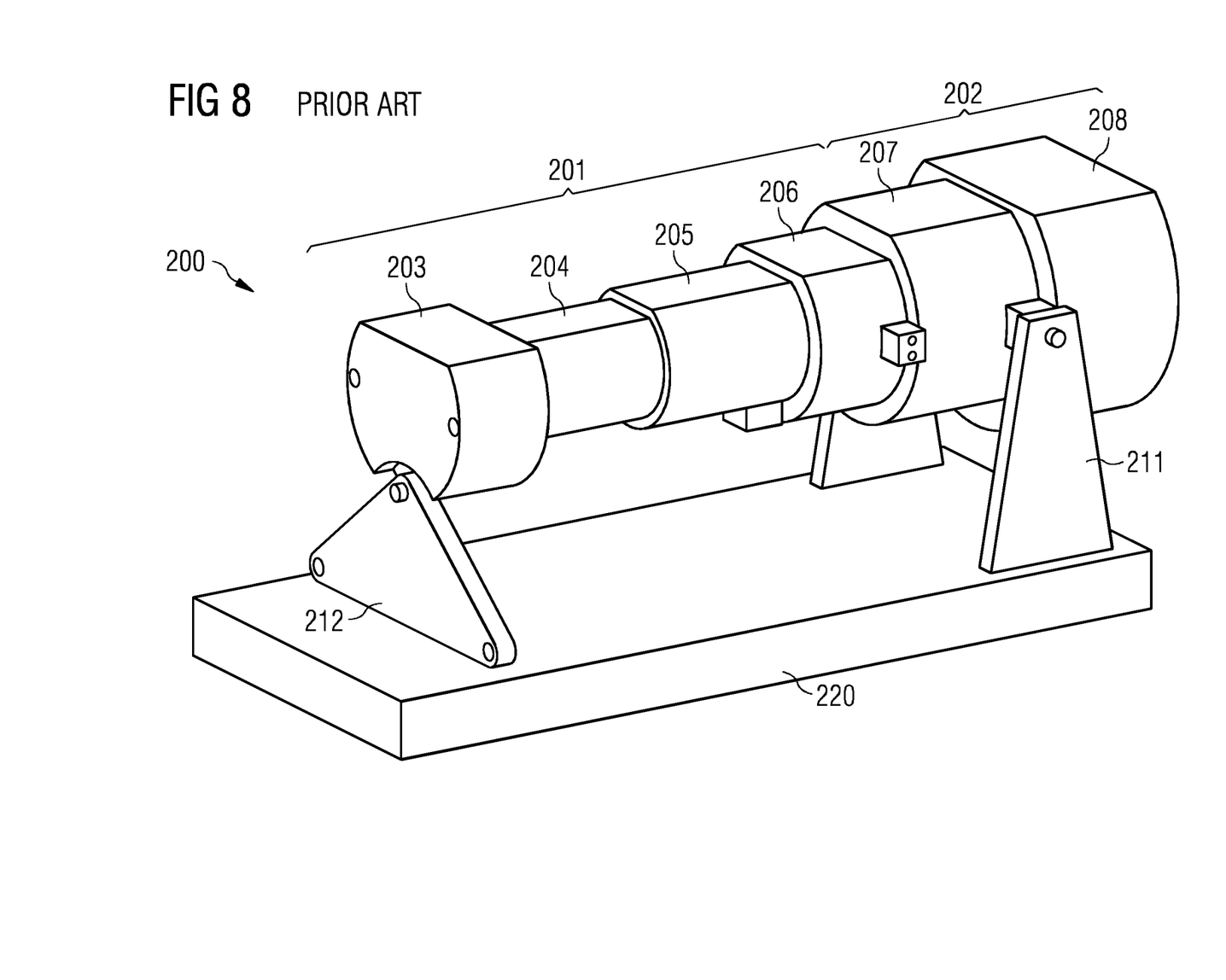
FIG. 8 shows a conventional support system for a gas turbine.

FIG. 8 shows a conventional two-shaft gas turbine 200. The gas turbine 200 is separated into a gas generator unit 201 and a power turbine unit 202.

In the compressor section of the gas generator unit 201, mechanical work of rotor blades is converted into fluid energy of a working fluid streaming through the gas turbine 200. The temperature of the working fluid is then further raised in the combustion section of the gas generator unit 201. Inside a turbine section of the gas generator unit 201, the working fluid expands and drives a shaft of the gas generator unit 201 connecting the turbine and the compressor of said unit. In the turbine section of the gas generator unit 201, fluid energy of the working fluid is converted to mechanical work by driving of the rotor blades. Approximately 50% (percent) of the energy of the working fluid converted to mechanical work is used for driving the blades the compressor section of the gas generator unit 201.

The working fluid flows further from the gas generator unit 201 to the power turbine unit 202. In a turbine section of the power turbine unit 202, the energy of the working fluid is converted in mechanical work for generating e.g. power for external use. Thereby the working fluid drives a further shaft of the power turbine unit 202, which further shaft is generally decoupled from the shaft of the gas generator unit 201.

The gas generator unit 201 and the power turbine unit 202 comprise functional units, such a gas inlet unit, compressor unit, turbine unit, which are arranged adjacent to each other along an axial direction of the gas turbine. Each functional unit is installed in an individual casing. Hence, the gas generator unit 201 comprises an inlet casing 203, a compressor casing 204, a center casing 205 including the combustion section and a compressor turbine casing 206. The power turbine unit 202 comprises e.g. a power turbine casing 207 and an exhaust casing 208.

Generally, the gas turbine 200 is supported during operation by a front beam 212 and two rear struts 211. The front beam 212 and the rear struts 211 support the gas turbine 200 to a ground 220. The front beam 212 supports, e.g. the inlet casing 203 of the gas generator unit 201. The inlet casing 203 is pivotably mounted to the front beam 212, wherein the pivoting axis of the inlet casing 203 extends generally parallel to an axial direction of the gas turbine 200. A further functional unit, such as the power turbine casing 207, is pivotably supported by the two rear struts 211, wherein the power turbine casing 207 is pivotable with respect to the rear struts 211 around a pivoting axis which is perpendicular to the pivoting axis of the front beam 212.

In order to remove the gas generator unit 201, e.g. for maintenance reasons, the functional unit which is closest to the power turbine unit 202 (i.e. the compressor turbine casing 206) has to be split off from the adjacent functional unit of the power turbine unit 202, i.e. the power turbine casing 207. In order to remove the gas generator unit 201, the gas generator unit 201 is connected to a sliding rail system on the ground that allows axial and transverse movement of the gas generator unit 201 with respect to the power turbine unit 202. For supporting the gas generator unit 201 independently after the gas generator unit 201 is split off from the power turbine unit 202, e.g. two temporary front struts have to be fixed to the inlet casing 203 and a temporary center strut has to be fixed to e.g. the compressor turbine casing 206, so that the gas generator unit 201 is provided with a three point support (the temporary center strut and the two temporary front strut assemblies). These temporary struts are connected to the sliding rails of the sliding rail system, so that the gas generator unit 201 can be slid forward away from the power turbine unit 202.

The temporary front support strut assemblies are not flexibly mounted to the casing. Hence, the front support strut assemblies are assembled to the inlet casing 203 during the maintenance of the gas generator unit 201 but have to be disconnected during the running of the gas turbine 200 to allow underbase twist (ground twist) to take place without stressing the casings.

During operation of the gas turbine 200, the rear support is provided by the horizontal pins of the rear struts 211 and by the front pin of the front beam 212, so that the ground twist is isolated from the engine casings. If the temporary support strut assemblies were to be attached during operation, the twist of the ground 212 would be transferred by the struts to the gas turbine casing (e.g. the inlet casing 203) which would harm the inlet casing 203, for example. In particular, there is a potential failure mode where the temporary support strut assemblies are left in place during engine running which could lead to casing damage or more seriously to rotor or bearing damage. A more serious failure mode would be if the temporary front support struts were not fitted prior to separation of the gas generator from the power turbine as then there would only be an unstable two point support for the gas generator. This failure mode does not apply to the temporary central strut 209, since this has to be in place in order to be able to separate the gas generator 201 from the power turbine 202.

The above-described method for splitting the gas generator unit 201 from the power turbine unit 202 is complex and time-consuming, e.g. because the temporary struts have to be assembled and disassembled for each maintenance cycle.

There is also a potentially lethal failure mode where the struts are not fitted prior to engine disassembly, leading to toppling of the gas generator on disconnection from the power turbine.

US 2005/0196227 A1 discloses a shock absorber in an elastomeric material for a suspension connecting rod. A screw is press-fitted to separate lugs. Between the lugs a rod head is mounted to the screw. An absorber part is mounted between the lugs and the rod head.

U.S. Pat. No. 3,831,888 discloses a three point monoball suspension system for attaching engine pylons to aircraft supporting structures. The engine pylons are attached by pins which are fixed without any play to a plug.

US 2003/0068192 A1 discloses a method and an apparatus for coupling a link connector to a clevis. A fastener is mounted into two lugs of a clevis, wherein the lugs are spaced apart. Between the lugs a clevis arm is interposed, wherein the fastener extends through a bore hole of the clevis arm. In the lugs and in the bore hole the fastener has no play. Between the lugs and the clevis arm support washers are interposed.

DE 1 013 466 A discloses a support for a turbo engine. A casing of a turbo engine is supported by four pendulum supports and an intermediate stiffening frame.

US 2009/0064685 A1 discloses a device and a method for mounting a turbine engine. An end of the turbine engine is fixed by support strut assemblies to a base. The other end of the support engine is mounted also by two support strut assemblies to the base, wherein a support plate element for damping vibrations is attached between the base frame of the base and the support strut assemblies.

US 2011/0000222 A1 discloses a gas turbine support system, wherein support legs support a respective axial end of the gas turbine to a ground.

US 2011/0016881 A1 discloses a gas turbine with a support system for an annular exhaust gas casing. The exhaust gas casing is supported to a supporting foundation by supporting devices wherein the supporting devices are flexibly mounted to the exhaust gas casing.

US 2002/0197147 A1 discloses a turbine frame with a casing supporter supporting a casing of a turbine. A half portion of a casing is flex supported to a base frame by a flexible stay. Between the flexible stay and the half portion of the casing a flexible fitting is interposed, wherein an upper and a lower swiveling member allows a pivoting of the half portion of the casing with respect to the stay.

SUMMARY OF THE INVENTION

It may be an objective of the present invention to provide a more efficient maintenance for a gas turbine.

This objective may be solved by a support strut assembly for supporting a casing of a functional unit of a gas turbine, by a gas turbine and by a method for supporting a casing of a functional unit of a gas turbine according to the independent claims.

According to a first aspect of the present invention, a support strut assembly for supporting a casing of a functional unit of a gas turbine is presented. The support strut assembly comprises a strut body for supporting the casing to a ground, a ball pivot element, a rocker lever and an elastomeric springing and damping element. The ball pivot element is pivotably mounted to the strut body for forming a ball joint. The rocker lever is mounted to the ball pivot element. The rocker lever is insertable into a bearing bore of a support body being a part of the casing or the ground, wherein the rocker lever is insertable into the bearing bore of the casing in a clearance fit, in particular a close fit, manner such that a pivotal point is generatable at a first contact area between the rocker lever and an inner surface of the bearing bore, so that the rocker lever is pivotable within the bearing bore around the pivotal point. The elastomeric springing and damping element is mounted to the rocker lever such that (i.e. if the rocker lever is inserted in the bearing bore) the elastomeric springing and damping element is interposable between the rocker lever and the support body, e.g. the bearing bore, for providing a centering force and damping a pivoting of the rocker lever with respect to the support body around the pivotal point.

The rocker lever has a limited travel against the relatively low resistance of the centering springing and damping element and then comes to a hard stop position against the support body, which gives a very high resistance to further movement. The rocker lever comes to a hard stop within the support body providing a support of high strength and stiffness.

According to a further aspect of the present invention, a gas turbine is presented. The gas turbine comprises a first functional unit with first casing. Furthermore, the gas turbine comprises a support strut assembly as described above. The rocker lever of the support strut assembly is inserted into the bearing bore of the support body in a clearance fit, i.e. close-fit manner, such that the rocker lever is pivotable between the bearing bore. The elastomeric springing and damping element is mounted to the rocker lever such that (e.g. if the rocker lever is inserted in the bearing bore) the elastomeric springing and damping element is interposable between the rocker lever and the support body, e.g. the bearing bore, for providing a centering force and damping a pivoting of the rocker lever with respect to the support body around the pivotal point. The rocker lever has a limited travel against the relatively low resistance of the centering spring element and then comes to a hard stop position against the support body, which gives a very high resistance to further movement.

According to a further aspect of the present invention, a method for supporting a casing of a functional unit of a gas turbine is presented. According to the method, the casing is supported to a ground by a strut body of a support strut assembly. A ball pivot element of the support strut assembly is pivotably mounted to the strut body for forming a ball joint. A rocker lever of the support strut assembly is mounted to the ball pivot element. The rocker lever is inserted into a bearing bore of a support body being a part of the casing or the ground, wherein the rocker lever is insertable into the bearing bore in a clearance fit manner such that a pivotal point is generated at a first contact area between the rocker lever and an inner surface of the bearing bore, so that the rocker lever is pivotable within the bearing bore around the pivotal point. The elastomeric springing and damping element is mounted to the rocker lever such that (i.e. if the rocker lever is inserted in the bearing bore) the elastomeric springing and damping element is interposable between the rocker lever and the support body, e.g. the bearing bore, for providing a centering force and damping a pivoting of the rocker lever with respect to the support body around the pivotal point. The rocker lever has a limited travel against the relatively low resistance of the centering spring element and then comes to a hard stop position against the support body, which gives a very high resistance to further movement.

By the present invention, the casing of the functional unit of the gas turbine is flexibly supported to the ground by the support strut assembly, such that also during operation of the gas turbine the support strut assembly may be kept attached to the gas turbine. Hence, during maintenance, where the gas compressor unit has to be separated from the power turbine unit, no additional assembly time for further supporting struts are necessary. Hence, a more efficient maintenance is achieved. The hard stop ensures that the gas compressor unit is firmly supported during maintenance.

The gas turbine according to the present invention may be a one-shaft or a multiple-shaft, e.g. two-shaft, gas turbine comprising a gas compressor unit and a power turbine unit.

The functional unit of a gas turbine may be a functional unit of the gas compressor unit or the power turbine unit. The functional unit may be provided by an inlet casing, a compressor casing, a center casing, a compressor turbine casing, a power turbine casing and an exhaust casing, wherein the functional units may be attached one after another along an axial direction of the gas turbine.

The support body may be a part of the ground or the casing of a functional unit. The support body may form a flange or a loop of the ground or the casing of a functional unit. The support body may be integrally formed with the ground or the casing of a functional unit or may be detachably mounted to the ground or the casing of a functional unit.

The strut body may be a rigid and stiff part of the support strut assembly which transfers the weight forces of the gas turbine to the ground. The strut body may be made of steel or other stiff and stable materials, such as reinforced plastics.

The ball pivot element comprises a ball shape or cylindrical shape, wherein the ball pivot element is pivotably mountable to the strut body. The strut body comprises at the mounting area with the ball pivot element a pivot joint housing into which the pivot ball element is pivotably mounted.

Figure 1:
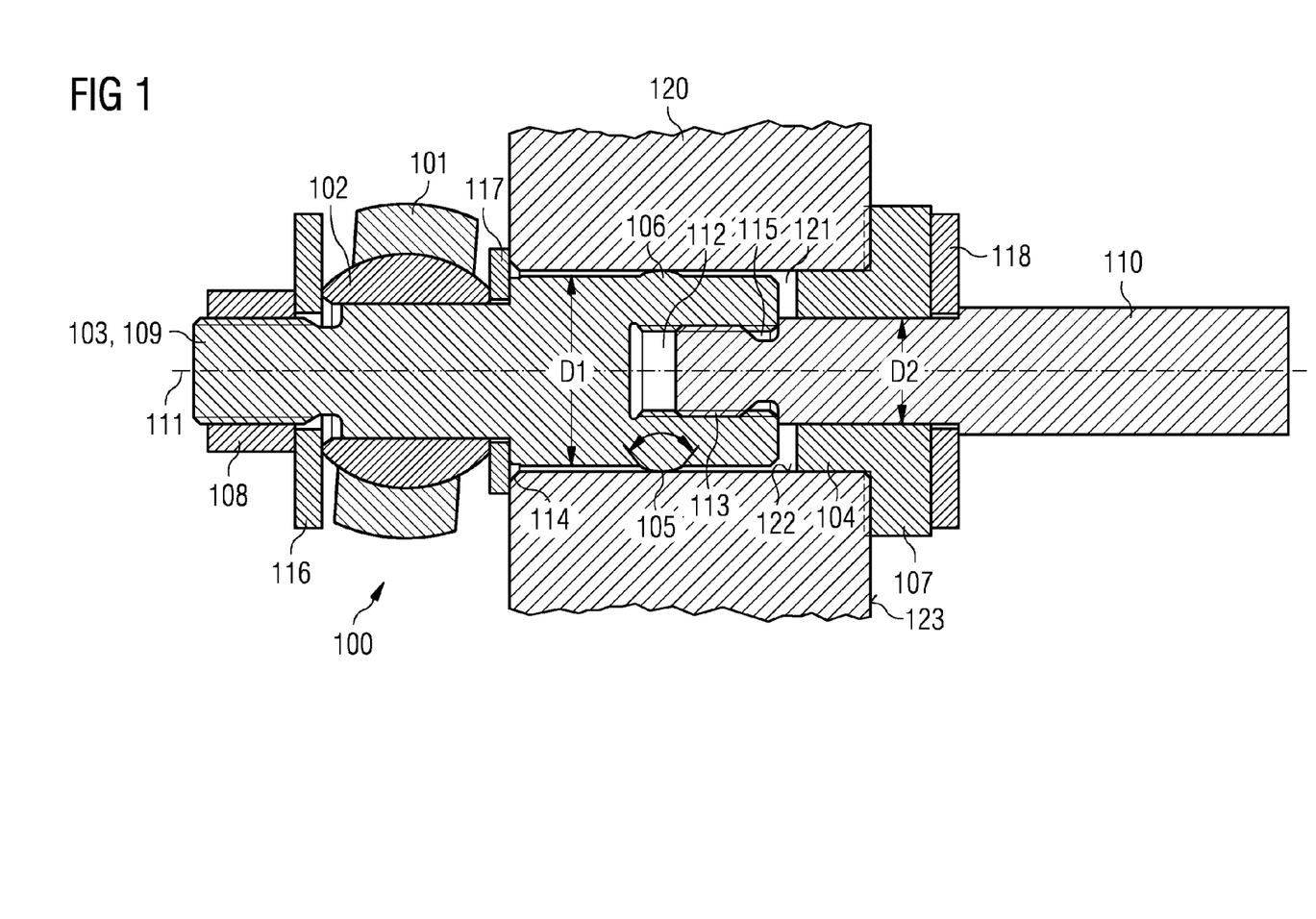
FIG. 1 shows a schematical view of a support strut assembly for a casing according to an exemplary embodiment of the present invention.

The rocker lever is mounted to the ball pivot element such that a relative pivotable movement between the rocker lever and the ball pivot element is avoided. For example, the ball pivot element may comprise a bore hole into which the rocker lever may be attached, e.g. by a screw fitting or by a press fit connection. In particular, the ball pivot element is not pressed or fixed to the support body and may not be in contact with the support body. The ball pivot element may only be coupled to the support body by the rocker lever. Furthermore, the ball pivot element is spaced from the support body. Hence, a pivoting of the ball pivot element and of the rocker lever with respect to the support body is achieved. The ball pivot element may be decoupled and/or spaced to the support body by fixing the ball pivot element (in particular against axial movement) to the rocker lever e.g. by pressing the ball pivot element against a shoulder of the rocker lever or against a disk (i.e. the second disc 117 as shown in FIG. 1) which is fixed to the rocker lever.

Moreover, the rocker lever is insertable into the bearing bore of the support body in a clearance-fit manner. The term "clearance-fit manner" denotes a clearance fit, in particular a close fitting and/or a loose fitting, respectively, between the rocker lever and the bearing bore. In other words, a small gap between the outer surface of the rocker lever and an inner surface of the bearing bore exists, when the rocker lever is inserted into the bearing bore. Due to a load acting on the rocker lever or by weight forces, the rocker lever has along its circumferential direction a first contact area to the inner surface of the bearing bore. This first contact area forms a pivotal point, such that the rocker lever is pivotable around the pivotal point with respect to the bearing bore and thus with respect to the support body.

The rocker lever may pivot around the pivotal point until a second contact area, which is axially spaced from the first contact area, is generated between the inner surface of the bearing bore and the rocker lever. Generally, the second contact area is generated at the edges of the bearing bore.

Hence, at the second contact, a so-called hard stop occurs, wherein the rocker lever stops abruptly pivoting around the pivotal point. The rocker lever then provides an anchor point at the hard stop for the strut that has a higher strength and a higher stiffness than that of conventional flexible mountings. The rocker lever comes to a hard stop within the support body, providing a support of high strength and stiffness. The hard stop is created between the rocker lever and the support body after a defined angular travel of the rocker lever to give a high strength and stiffness support for the supported casing.

In conventional approaches, a clearance fit is generated between the ball pivot element and a fixed stud inside a bore of the ball pivot element. Hence also a hard stop is generated between the ball pivot element and the fixed stud. Because of the clearance the fixed stud is thinner than the rocker lever and therefore weaker.

By providing the hard stop between the support body and the rocker lever according to the claimed invention, a more stable and robust support strut assembly is achieved. The strut body may be formed larger and more robust in comparison to the ball pivot element, because the rocker lever is stronger than the conventional fixed stud.

Because the clearance fit is formed between the support body and the rocker lever, a form fit or frictional connection between the ball pivot element and the rocker lever may be generated.

In order to provide a centering force and damp and decelerate the pivoting of the rocker lever around the pivotal point, the elastomeric springing and damping element is interposed between the rocker lever and the support body, between the inner surface of the bearing bore or the outer surface of the support body. Hence, when the rocker lever pivots around the pivotal point, the elastomeric springing and damping element is pressed together and thereby provides a centering force and damps the movement of the rocker lever. If the rocker lever pivots back, the elastomeric springing and damping element expands again due to its elastomeric characteristics.

The elastomeric springing and damping element may be formed as an elastomeric bushing which is attached around the rocker lever. The elastomeric springing and damping element may be made of natural or synthetic rubber or other elastic material.

Hence, by the present invention, a flexible mounting is achieved by the claimed support strut assemblies allowing the support strut assemblies to remain permanently attached to the gas turbine, also during operation. By the interaction of the clearance-fit manner of the rocker lever inside the bearing bore and the attached elastomeric springing and damping element, the rocker lever has a damped sprung travel up to the hard stop. Hence, by the support strut assembly as described above, a support of the gas turbine to the ground is achieved and at the same time an underbase twist (ground twist) may take place without stressing the casings during operation.

The requirement for the strut mounting is that it has to be very stiff and strong, i.e. to cope with lateral loading e.g. due to rolling of a ship in which the gas turbine is loaded, for example. Then it has the contradictory requirement of being very flexible to avoid casing stress due to underbase twist. The solution to these requirements is to provide the claimed support strut assembly, in particular to provide a small amount of flexible travel (e.g. by the clearance fitting), but to make sure that after this travel the hard stop at the support body is reached so that the mounting is very stiff and with a high strength.

According to a further exemplary embodiment, the rocker lever comprises a radiussed or spherical collar which is formed such that, when the rocker lever is inserted in the bearing bore, the first contact area is formed between the spherical collar and the inner surface of the bearing bore. Hence, the pivotal point is generated within the spherical collar at a predefined axial position, i.e. the spherical collar.

The rocker lever has reduced diameters on either side of the spherical collar which allows a predefined limited angular travel until the rocker lever contacts the support body at a second contact area. The spherical collar may comprise a rounded surface, wherein the first contact area is formed between a section of the rounded surface and the inner surface of the bearing bore. Hence, by providing the rounded surface, a proper and smoother tilting or rocking of the rocker lever around the pivotal point is achieved.

According to a further exemplary embodiment the elastomeric springing and damping element is interposable between the rocker lever and the inner surface of the bearing bore. Additionally or alternatively, the elastomeric springing and damping element is a further elastomeric springing and damping element which is mountable between the rocker lever and an outer surface of the support body, such that an axial movement of the rocker lever along the bearing bore is sprung or is sprung and damped. The axial movement may describe a movement along a rotary/symmetry axis of the rocker lever and/or along a center axis of the bearing bore.

According to a further exemplary embodiment, the elastomeric springing and damping element and the further elastomeric springing and damping element are formed monolithically. In other words, the elastomeric springing and damping element and the further elastomeric springing and damping element may form a common elastomeric bushing. In particular, the elastomeric bushing comprises a circumferential extending edge, wherein the further elastomeric bushing is formed by the edge region of the elastomeric bushing. Hence, pivotable and axial springing and damping may be provided by one common elastomeric bushing.

According to a further exemplary embodiment, the ball pivot element comprises a stud hole into which the rocker lever is mounted. The rocker lever may be mounted to the stud hole e.g. by a screw fitting or by a press fit connection.

According to a further exemplary embodiment, the ball pivot element comprises a through hole through which the rocker lever is inserted such that the rocker lever is mounted to the ball pivot element. In particular, the rocker lever has an end section which comprises a thread. The rocker lever is inserted through the through hole such that the rocker lever is mounted to the ball pivot element by a nut and bolt connection. The nut is mountable to the thread such that the ball pivot element may be pressed between a shoulder on the rocker lever and the nut, for example.

According to a further exemplary embodiment, the rocker lever comprises a rocker element and a stud. The rocker element and the stud comprise a common rotary axis. The rocker element and the stud are mounted together along the common rotary axis. The rocker element comprises a larger external diameter than the stud, wherein the elastomeric springing and damping element is mountable between the stud and the bearing bore. Hence, the rocker lever may comprise two axially separated parts. This may make the assembly of the support strut assembly to the support body easier.

Moreover, the rocker element and the stud may be axially connected in such an adjustable way so that the axial length of the rocker lever may be adjustable. For example, according to a further exemplary embodiment, the rocker element comprises a threaded hole, wherein the stud comprises an external thread which fits into the threaded hole such that the stud is screwed into the rocker element. Hence, by adjusting the screw-in depth, the overall axial length of the rocker lever is adjustable. Furthermore, by screwing the stud into the rocker element, a controlled axial compression of the elastomeric springing and damping element is adjustable.

According to a further exemplary embodiment, the gas turbine further comprises a further support strut assembly for supporting the first casing to the ground. The first casing comprises a further bearing bore and the further support strut assembly which is mounted to the further bearing bore. Hence, to one common casing, a regular support strut assembly and the above-described support strut assemblies may be attached to one casing.

In a further exemplary embodiment, the further support strut assembly is a support strut assembly as described above.

Hence, one or a plurality of flexible support strut assemblies may be attached to a casing and the ground, respectively, in order to provide a flexible mounting to the ground.

According to a further exemplary embodiment, the gas turbine further comprises a second casing of a second functional unit of a gas turbine wherein the first casing and the second casing are mounted together along an axial direction of the gas turbine. Furthermore, the gas turbine further comprises a central strut for supporting the second casing to the ground. Hence, by the support strut assembly, the further support strut assembly and the central strut a three point support of the first casing and the second casing may be provided.

Summarizing, the elastomeric springing and damping element fills a radial space between the rocker lever and the bearing bore of a support body being part of the casing or the ground, so that a radial load in the elastic damping element is generated due to a pivoting and an angular displacement of the rocker lever around the pivotal point within the bearing bore. There may be also some axial sliding of the rocker lever along the center axis of the bearing bore due to e.g. the tilting of the rocker lever around the pivotal point.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematical. It is noted that in different figures, similar or identical elements are provided with the same reference signs.

FIG. 1 shows an exemplary embodiment of a support strut assembly 100 for a casing of a functional unit of a gas turbine 200 (see FIG. 2) according to the present invention. The support strut assembly 100 comprises a strut body 101 for supporting the casing to a ground 220 (see FIG. 2). The support strut assembly 100 further comprises a ball pivot element 102 which is pivotable mounted to the strut body 101 for forming a ball joint. The support strut assembly 100 further comprises a rocker lever 103 which is mounted to the ball pivot element 102. The rocker lever 103 is inserted into the bearing bore 121 of a support body 120 being a part of the casing or the ground 220, wherein the rocker lever 103 is insertable into the bearing bore 121 in a clearance-fit or close-fit manner such that a pivotal point 105 is generated at a first contact area between the rocker lever 103 and an inner surface 122 of the bearing bore 121, so that the rocker lever 103 is pivotable within the bearing bore 121 around the pivotal point 105.

As shown in FIG. 1, an elastomeric springing and damping element 104 (e.g. an elastomeric bushing) is mounted between the rocker lever 103 and the bearing bore 121 such that a pivoting of the rocker lever 103 with respect to the support body 120 around the pivotal point 105 produces a centering force and is dampable. The bearing bore 121 is formed by a through hole in an edge part or a flange of the support body 120 mounted to the casing or the ground 220. Hence, the bearing bore 121 is accessible from both sides.

The rocker lever 103 is inserted into the bearing bore 121 wherein a section of the rocker lever 103 extends and protrudes outside of the bearing bore 121.

In the exemplary embodiment shown in FIG. 1, the rocker lever may comprise two parts, in particular of a rocker element 109 and a stud 110. The rocker element 109 and the stud 110 are attached along an axial direction which is parallel to a rotary axis 111 of the rocker lever 103. The rocker element 109 comprises a first diameter D1 and the stud 110 comprises a second diameter D2, wherein the first diameter D1 is larger than the second diameter D2.

The rocker element 109 and the stud 110 may be fixed together e.g. by a screw fitting, wherein the rocker element 109 comprises a threaded hole 112 which extends along the rotary axis 111 and the stud 110 comprises an end section with an external thread 113 which can be screwed into the threaded hole 112 to a stop position defined by e.g. a larger diameter of stud 110 being greater than the hole diameter of the threaded hole 112. The stud 110 comprises adjacent to the external thread a recess 115. Alternatively, dependent on the depth of engagement of the external thread 113 in the threaded hole 112, the length of the rocker lever 103 is adjustable, with thread locking being provided using a locking thread insert or a locking compound on the threads.

The rocker lever 103 is mounted into the bearing bore 121 in a clearance-fit manner which means that the diameter of the bearing bore 121 is slightly larger than the external diameter D1 of the rocker lever 103. Hence, a gap between the external surface of the rocker lever 103 and the inner surface 122 of the bearing bore 121 may exist. Hence, the rocker lever 109 is freely movable and pivotable inside the bearing bore 121, such that a flexible mounting of the rocker lever 103 and thus of the support strut assembly is achieved.

The pivoting of the rocker lever 103 inside the bearing bore 121 is conducted around a pivotal point 105 which is formed at a first contact area of the rocker lever 103 and the inner surface 122 of the bearing bore 121.

In order to clearly define the location of the pivotal point 105 along the rotary axis 111, the rocker lever 103, in particular the rocker element 109, comprises a radiussed or circular collar 106. The spherical collar 106 defines the largest external diameter of the rocker lever 103, which means that at either side of the spherical collar 106 the rocker lever 103 comprises a smaller diameter D1 with respect to the diameter of the spherical collar 106. Hence, when the rocker lever 103 pivots, the pivotal point 105 is generally generated in the region of the spherical collar 106.

The rocker lever 103 pivots around the pivotal point 105 until the external surface of the rocker lever 103 generates a second contact area with the inner surface 122 of the bearing bore 121. Generally, the second contact area is generated at the edge sections of the bearing bore 121. When the rocker lever 103 contacts with the second contact area the inner surface 122 of the bearing bore 121, the rocker lever 103 is stopped abruptly its pivoting by a hard stop. In order to reduce the impact of the hard stop, at the edge sections of the bearing bore 121 a shallow chamfer region 114 is formed.

Between the outer surface of the rocker lever 103 and the inner surface 122 of the bearing bore 121 the elastomeric springing and damping element 104 is placed. The elastomeric springing and damping element 104 is e.g. an elastomeric bushing, in particular a rubber bushing, for example. Hence, when pivoting the rocker lever 103 around the pivotal point 105, the part of the elastomeric springing and damping element 104 is pressed together such that the pivoting of the rocker lever 103 produces a centering force and is damped.

Moreover, a further elastomeric springing and damping element 107 may be attached to the rocker lever 103. The further elastomeric springing and damping element 107 is attachable between an outer surface 123 of the support body 120 and a stop at the rocker lever 103, in particular the stud 110. The stop may be formed either by a shaft shoulder at the rocker lever 103 or by a disk, e.g. a third disk 118 in FIG. 1.

Additionally or Alternatively, instead of the third disk 118, the rocker lever 103, in particular the stud 110, may have a bolt head which diameter is larger than the diameter of the bearing bore 121, so that a surface of the bold head contacts the outer surface 123 and/or the (further) springing and damping element 104 (107).

The outer surface 123 describes the surface of the support body 120 which is generally normal to the rotary axis 111, i.e. a normal of the surface to the rotary axis 111.

In order to rock rather than to move the elastomeric springing and damping element 104 simply out of centre as much as the clearance between collar 106 and the inner surface 122 allows, the further elastomeric springing and damping element 107 may be present in combination with the elastomeric springing and damping element 104. Therefore, the elastomeric springing and damping element 104 and the further elastomeric springing and damping element 107 may be formed monolithically (integrally), such as a bushing with an edge section.

The ball pivot element 102 is axially clamped to the rocker lever 103, between a first disk 116 and a second disk 117. The ball pivot element 102 is not directly clamped to the support body 120 but spaced and pivotable with respect to the support body 120.

Rocking of the rocker lever 103 causes lateral sliding and an angular change of the rocker lever 103, i.e. its collar 106, with respect to the mating face on the support body 120. This generates axial sliding of the rocker lever 103, which is absorbed by compression of the elastomeric springing and damping element 104, 107.

Alternately the second disk 117 and/or the third disk 118 may comprise a spherical and rounded surface, which spherical surface is in contact with the outer surface 123 of the support body 120 in order for rocking to occur. The spherical surfaces of the second disk 117 and the third disk 118 may have the same spherical diameters. Furthermore, the second disk 117 and the third disk 118 may comprise a respective inner hole which diameter is larger than the respective diameter of the rocker lever 103 at a respective area of contact between each other. Hence, an axial movement between the second disk 117 and/or the third disk 118 and the rocker lever 103 may be possible.

In a further exemplary embodiment, only the further elastomeric springing and damping element 107 may be used without the elastomeric springing and damping element 104 or vice versa.

At an opposed side of the rocker lever 103 with respect to the damping element 107, the rocker lever 103 is fixed to the ball pivot element 102. The ball pivot element 102 may have a round, ball-like outer shape such as a joint ball. The ball pivot element 102 is pivotally attached to a joint socket which is formed in the strut body 101, i.e. to a coupling section 401 at a rod end (see FIG. 4) which is screwed into a body of the strut body 101. The ball pivot element 102 has a through hole through which the rocker lever 103 extends. The rocker lever 103 may be fixed to the ball pivot element 102 by a screw connection or by a press fit connection, for example. Moreover, the rocker lever 103 may extend through the through hole of the ball pivot element 102, wherein at the end of the rocker lever 103 which faces away from the support body 120, a nut and bolt connection may be formed, such that the ball pivot element 102 is clamped between the second disc 117 which sits on a shaft shoulder of the rocker lever 103 and washer 116 which is clamped by nut 108.

The ball pivot element 102 is formed in such a way that the strut body 101, e.g. the strut body end, is spaced from the first disk 116 and the second disk 117, so that a limited pivoting of the strut body 101 between the first disk 116 and the second disk 117 may be possible.

Hence, by the support strut assembly 100 as shown in FIG. 1, a flexible but robust support fixing for the casing to a ground 220 is achieved.

Figure 4:
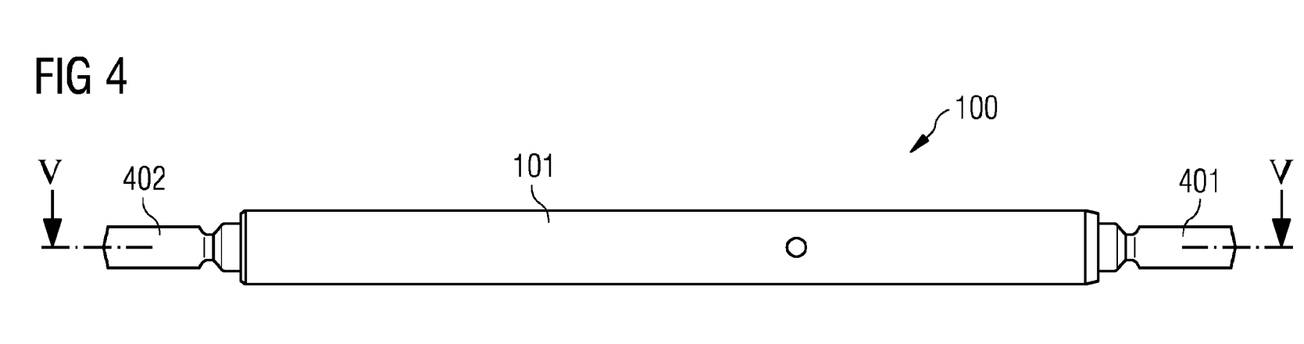
FIGS. 4 and 5 show schematical views of a strut body of a support strut assembly according to an exemplary embodiment of the present invention.
Figure 5:
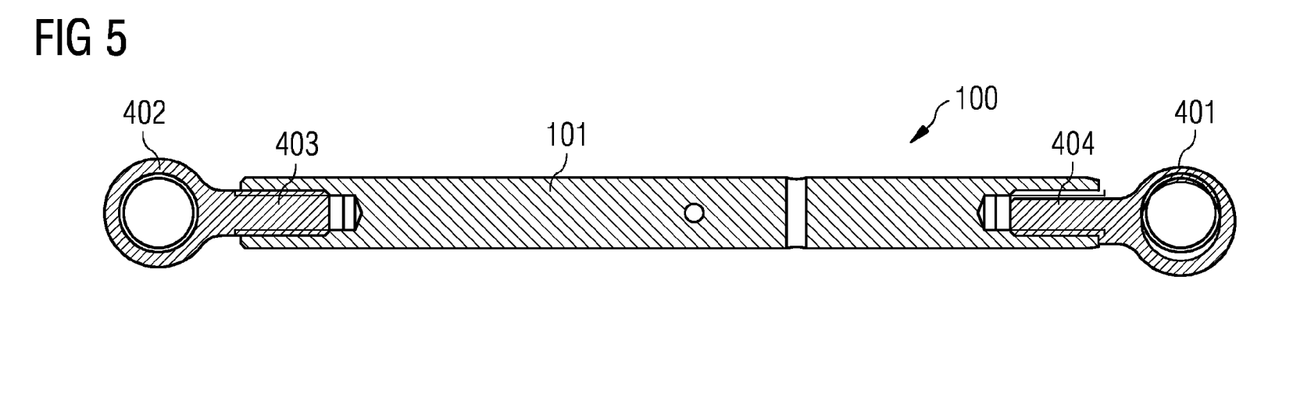

As can be further taken from FIG. 1, the rocker lever 110 extends for a distance behind the support body 120 (see e.g. right end section of the rocker lever 110 in FIG. 1). The rocker lever 110 protrudes from the support body 120 such that the free end section, which is not located inside the bearing bore 121, may act as a visual indicator. In order to ensure that the rocker lever 110 is centered within the bearing bore 121 of the support body 120 the strut body 101 may be adjusted in length (e.g. by adjusting the connection pins 403, 404 of the strut body 101 as shown in FIG. 4 and FIG. 5) until the rocker lever 110 is seen to be horizontal. By the protruding end section of the rocker lever 110 an easier detection of the horizontal position of the rocker lever 110 is achieved.

Figure 2:
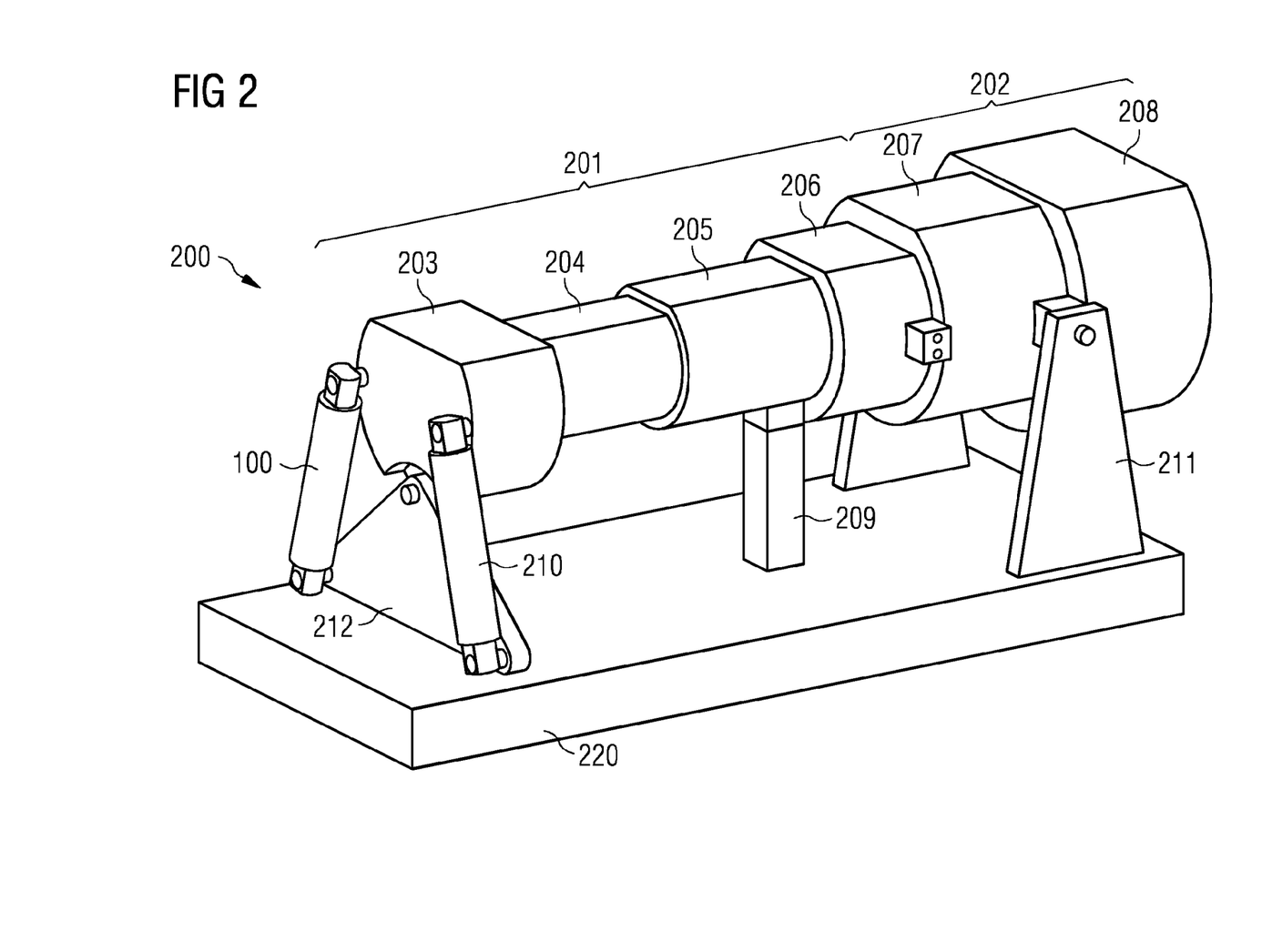
FIG. 2 shows an overall view of a gas turbine according to an exemplary embodiment of the present invention.
Figure 3:
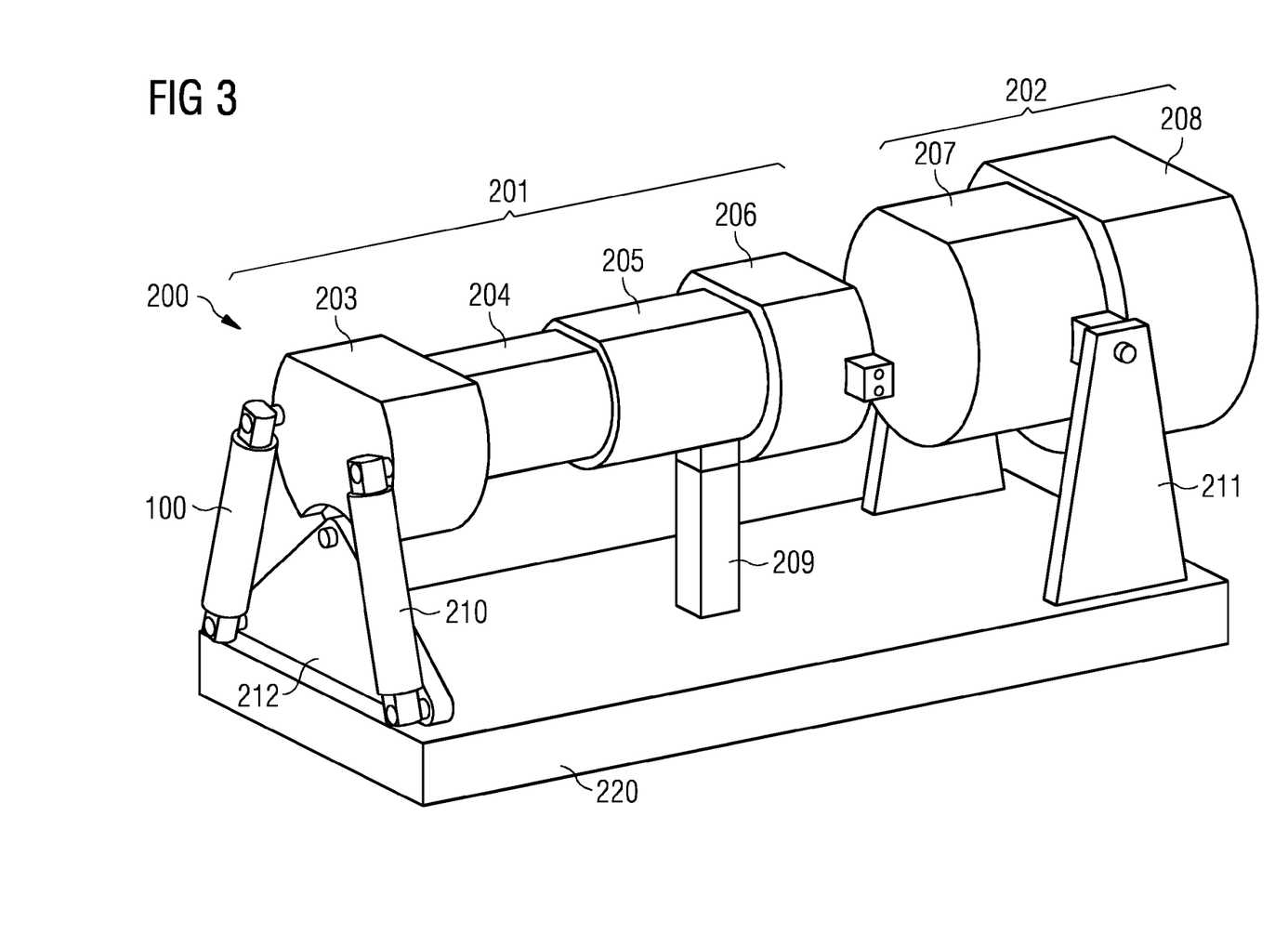
FIG. 3 shows an overall view of a gas turbine according to an exemplary embodiment of the present invention, wherein the gas generator unit is separated from the power turbine unit.

FIG. 2 and FIG. 3 show an overall view of a gas turbine 200. The gas turbine 200 comprises a gas generator unit 201 and a power turbine unit 202.

Each of the gas generator unit 201 and the power turbine unit 202 comprises a plurality of functional units, wherein each functional unit comprises respective casings. Along the axial direction of the gas turbine, each functional unit is mounted to an adjacent one of the functional units. As shown in FIG. 2 along the axial direction, the inlet casing 203, the compressor casing 204, the center casing 205 (e.g. including the combustion system), the compressor turbine casing 206 are mounted to each other and forming together the gas generator unit 201. Moreover, the power turbine casing 207 and the exhaust casing 208 form the power turbine unit 202.

For maintenance reasons, the gas generator unit 201 has to be separated from the power turbine unit 202. Generally, the gas turbine 200 is supported by a front beam 212 and by two rear struts 211. In order to achieve a self-supporting support for the gas generator unit 201, a three point support has to be achieved. Hence, besides the front beam 212, two support strut assemblies, in particular the support strut assembly 100 and the further support strut assembly 210, are mounted to the inlet casing 203 and a central strut 209 is mounted to another casing, such as the central casing 205 which may comprise e.g. the combustion system (not explicitly shown in FIG. 2) in order to form a self-supporting three point support with the ground 220. If the support strut assembly 100 and the further support strut assembly 210 would be rigidly fixed to the respective casings 202, 205, the gas generator unit 201 would twist with the ground 220 and high stresses in the casings would occur. If at least one of the support strut assemblies is a support strut assembly 100 as shown in FIG. 1, the gas generator unit 201 comprises a higher flexibility such that a twisting with the ground 220 may be prevented. Hence, all support elements, such as the support strut assembly 100 and the further support strut assembly 210 may be kept assembled to the respective casings also during operation of the gas turbine. Hence, maintenance time is reduced because the support strut assemblies 100, 210 have not to be mounted and demounted only for maintenance purposes.

FIG. 4 and FIG. 5 show a more detailed view of the strut body 101 of the support strut assembly. The strut body 101 comprises at its axial end sections a coupling section 401 and a further coupling section 402. The coupling sections 401, 402 may be formed by an annulus or a flange into which the ball pivot element 102 is pivotably mountable. The coupling sections 401, 402 may be screwed by a respective connection pin 403, 404 into a respective threaded hole of the strut body 101. Hence, the extension along the axial axis of the strut body 101 may be adjusted by the screw depth of the coupling sections 401, 402 into the strut body 101.

Figure 6:
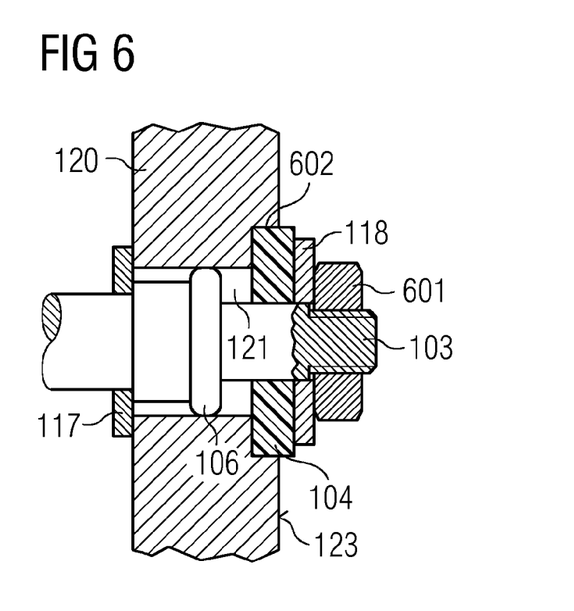
FIG. 6 shows a schematical view according to the present invention, wherein the elastomeric springing and damping element comprises a ring shape.

FIG. 6 shows in detail an end section of the rocker lever 103 where the elastomeric springing and damping element 104 is attached to the rocker lever 103, in particular to the stud 110. To the outer surface 123 of the support body 120 an annular recess 602 is machined. The elastomeric springing and damping element 104 is inserted inside the annular recess 602. The elastomeric springing and damping element 104 contacts the surface 123 of the support body 120 with a surface which is parallel to the rotary axis 111 and with a further surface which is radial and perpendicular to the rotary axis 111, i.e. which normal is directed parallel to the rotary axis 111 and with a further surface which normal is directed radially and perpendicular to the rotary axis 111.

The elastomeric springing and damping element 104 is pressed towards the outer surface 123 by e.g. a nut and bolt connection. For example, at an end section of the rocker lever 103 a nut 601 may be screwed onto the rocker lever 103. Thereby a pressing force may be transmitted to the elastomeric springing and damping element 104. Between the nut 601 and the elastomeric springing and damping element 104, the third disk 118 may be interposed.

The elastomeric springing and damping element 104 may be formed homogeneously with a ring shape without any modifications, such as offset region or flanges.

Figure 7:
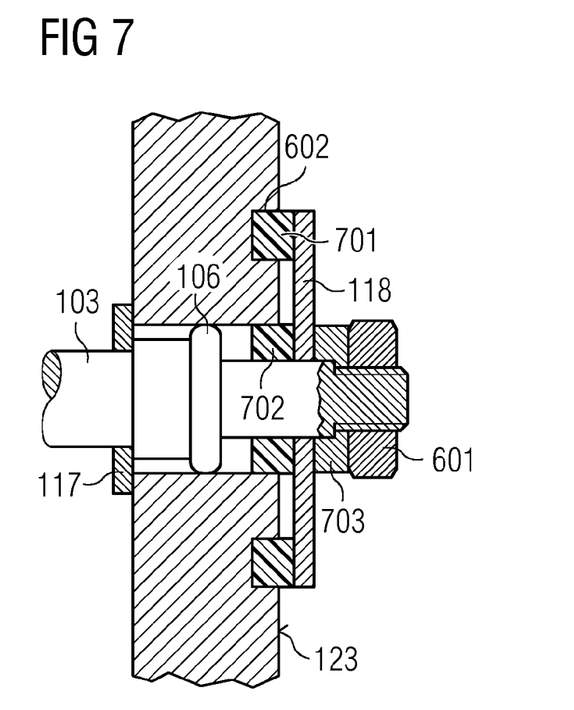
FIG. 7 shows a schematical view according to the present invention, wherein a plurality of elastomeric springing and damping elements are applied.

Furthermore, a further annular ring may also be machined into the rocker lever 103 for fixing the elastomeric springing and damping elements 104, 107 and/or the second elastomeric springing and damping element 702 (see FIG. 7).

FIG. 7 shows an exemplary embodiment, wherein a plurality of e.g. homogeneously annular shaped elastomeric springing and damping elements 701, 702, 703 may be used. The annular recess 602 may be machined into the outer surface 123 of the support body 120, so that the annular recess 602 is spaced from the bearing bore 121. The third disk 118 is interposed between the nut 601 and a first (e.g. annular and ring shaped) elastomeric springing and damping element 701 which is inserted into the annular recess 602. Axial forces may be transmitted between the first elastomeric springing and damping element 701, the third disk 118 and the nut 601 and thus the rocker lever 103.

A second (e.g. annular and ring shaped) elastomeric springing and damping element 702 is inserted between the rocker lever 103 and the inner surface 122 of the bearing bore 121. The second elastomeric springing and damping element 702 may be axially movable along the rocker lever 103. The second elastomeric springing and damping element 702 transmits generally the radial forces between the rocker lever 103 and the support body 120.

Furthermore, a third (e.g. annular and L-ring shaped) elastomeric springing and damping element 703 is interposable between the nut 601 and third disk 118 in order to further adjust the damping capabilities.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A support strut assembly for supporting a casing of a functional unit of a gas turbine, the support strut assembly comprising:
    a strut body for supporting the casing to a ground,
    a ball pivot element which is pivotably mounted to the strut body for forming a ball joint and which comprises a through hole,
    a rocker lever extending through the through hole in the ball pivot element,
    wherein the rocker lever is insertable into a bearing bore that is spaced from the ball pivot element and of a support body being a part of the casing or the ground,
    wherein the rocker lever is insertable into the bearing bore in a clearance fit manner such that a pivotal point is generated at a first contact area between the rocker lever and an inner surface of the bearing bore, so that the rocker lever is pivotable within the bearing bore around the pivotal point until stopped by a second contact area, which is axially spaced from the first contact area, is generated between the inner surface of the bearing bore and the rocker lever,
    an elastomeric springing and damping element which is mounted to the rocker lever such that the elastomeric springing and damping element is interposable between the rocker lever and the support body for providing a centering force and damping a pivoting of the rocker lever with respect to the support body around the pivotal point, and
    wherein the second contact area is between the elastomeric springing and damping element and the ball pivot element.

2. The support strut assembly according to claim 1, wherein the rocker lever is insertable into the bearing bore such that the second contact area is generatable at an edge of the bearing bore.

3. The support strut assembly according to claim 1, wherein the rocker lever comprises a radiussed or spherical collar which is formed such that, when the rocker lever is inserted in the bearing bore, the pivotal point is generated between the spherical collar and the inner surface of the bearing bore.

4. The support strut assembly according to claim 1, wherein the elastomeric springing and damping element is interposable between the rocker lever and the inner surface of the bearing bore.

5. The support strut assembly according to claim 1, wherein the elastomeric springing and damping element is a further elastomeric springing and damping element which is interposable between the rocker lever and an outer surface of the casing for damping additionally an axial movement of the rocker lever with respect to the support body along the bearing bore.

6. The support strut assembly according to claim 5, wherein the elastomeric springing and damping element and the further elastomeric springing and damping element are formed monolithically.

7. The support strut assembly according to claim 1, wherein the ball pivot element comprises a stud hole into which the rocker lever is inserted.

8. The support strut assembly according to claim 1, wherein the rocker lever has an end section which comprises a thread, wherein the rocker lever is inserted through the through hole such that the rocker lever is mounted to the ball pivot element by a nut and bolt connection.

9. The support strut assembly according to claim 1,
    wherein the rocker lever comprises a rocker element and a stud,
    wherein the rocker element and the stud comprise a common rotary axis,
    wherein the rocker element and the stud are mounted together along the common rotary axis,
    wherein the rocker element comprises a larger external diameter than the stud, and
    wherein the elastomeric springing and damping element is mountable between the stud and the bearing bore.

10. The support strut assembly according to claim 9, wherein the rocker element comprises a threaded hole, wherein the stud comprises an external thread which fits into the threaded hole such that the stud is screwed into the rocker element.

11. A gas turbine, comprising a first functional unit with a first casing, wherein the first casing comprises the bearing bore, and the support strut assembly according to claim 1, wherein the rocker lever is inserted into the bearing bore of the support body of the first casing or the ground in a loose fit manner.

12. The gas turbine according to claim 11, further comprising a further support strut assembly for supporting the first casing to the ground,
- wherein the first casing comprises a further bearing bore, and
- wherein the further support strut assembly is mounted to the further bearing bore.

13. The gas turbine according to claim 12, wherein the further support strut assembly is a support strut assembly according to claim 1.

14. The gas turbine according to claim 11, further comprising
- a second casing of a second functional unit of a gas turbine,
- wherein the first casing and the second casing are mounted together along an axial direction of the gas turbine, and
- a central strut for supporting the second casing to the ground.

15. A method for supporting a casing of a functional unit of a gas turbine, the method comprising:
- supporting the casing to a ground by a strut body of a support strut assembly,
- wherein a ball pivot element of the support strut assembly is pivotable mounted to the strut body for forming a ball joint and comprises a through hole,
- wherein a rocker lever of the support strut assembly extends through the through hole of the ball pivot element,
- wherein the rocker lever is inserted into a bearing bore that is spaced from the ball pivot element and of a support body being a part of the casing or the ground,
- wherein the rocker lever is insertable into the bearing bore in a clearance fit manner such that a pivotal point is generated at a first contact area between the rocker lever and an inner surface of the bearing bore, so that the rocker lever is pivotable within the bearing bore around the pivotal point until stopped by a second contact area, which is axially spaced from the first contact area, is generated between the inner surface of the bearing bore and the rocker lever,
- wherein an elastomeric springing and damping element is mounted to the rocker lever such that the elastomeric springing and damping element is interposable between the rocker lever and the support body for providing a centering force and damping a pivoting of the rocker lever with respect to the casing around the pivotal point, and
- wherein the second contact area is between the elastomeric springing and damping element and the ball pivot element.

\* \* \* \* \*